United States Patent [19]

Benjamin et al.

[11] Patent Number: 4,511,818

[45] Date of Patent: Apr. 16, 1985

[54] PIEZOELECTRIC GENERATOR DRIVEN BY A COMBUSTION ENGINE

[75] Inventors: James A. Benjamin, Waukesha; Herman P. Schutten, Milwaukee, both of Wis.

[73] Assignee: Eaton Corporation, Cleveland, Ohio

[21] Appl. No.: 452,353

[22] Filed: Dec. 22, 1982

[51] Int. Cl.³ .............................................. H01L 41/08
[52] U.S. Cl. .................................... 310/338; 310/319; 310/339
[58] Field of Search ............... 310/338, 339, 319, 365, 310/328

[56] References Cited

U.S. PATENT DOCUMENTS

| 1,955,471 | 4/1934 | Pooler | 310/339 X |
| 2,539,535 | 1/1951 | Espenschied | 310/339 X |
| 3,198,969 | 8/1965 | Kolm et al. | 310/339 X |
| 3,215,133 | 11/1965 | Farrell | 310/339 |
| 3,390,287 | 6/1968 | Sonderegger | 310/365 |
| 3,463,942 | 8/1969 | Mellon | 310/339 X |

Primary Examiner—Mark O. Budd
Attorney, Agent, or Firm—Andrus, Sceales, Starke & Sawall

[57] ABSTRACT

An engine having a combustion driven piston is provided with piezoelectric transducer means responsive to piston movement to generate a voltage.

3 Claims, 3 Drawing Figures

PIEZOELECTRIC GENERATOR DRIVEN BY A COMBUSTION ENGINE

BACKGROUND AND SUMMARY

The invention relates to electrical generators using a combustion engine to generate electricity. Typically, a piston, driven by explosion of a fuel mixture in an internal combustion engine, drives a crank shaft and pulley which in turn rotates an armature through a magnetic field to generate a voltage. This is a multistep conversion process.

The present invention provides a more direct conversion process from the input fuel energy to the output electrical energy. This is accomplished by piezoelectric conversion of piston movement to electrical energy. In one implementation, direct conversion to AC is afforded.

DETAILED DESCRIPTION

Figure 1:
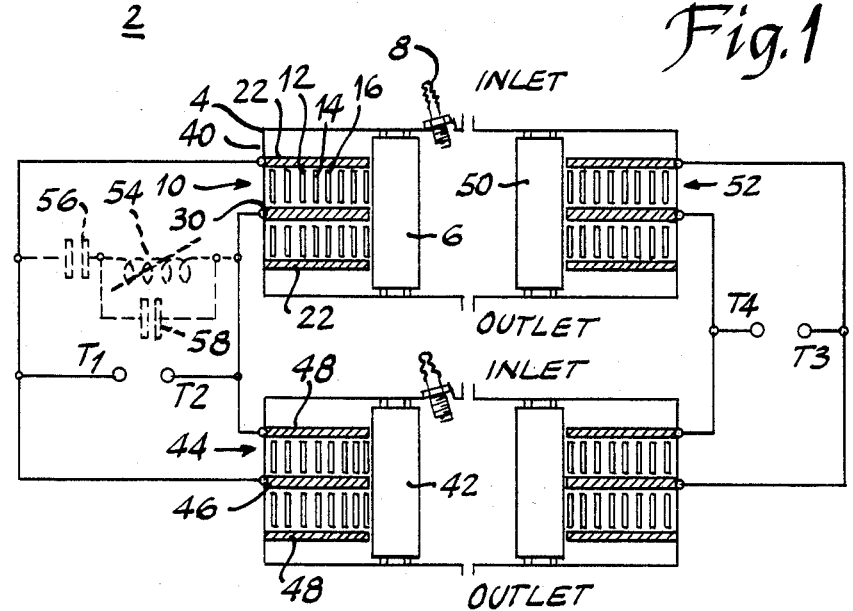
FIG. 1 is a schematic illustration of a piezoelectric generator constructed in accordance with the invention.

FIG. 1 shows a piezoelectric generator 2 including a combustion engine 4 having a piston 6 driven leftwardly by explosion of a fuel mixture upon ignition by spark plug 8 in conventional manner. Piezoelectric transducer means 10 responds to piston movement to generate a voltage. Piezoelectric transducer means 10 comprises a plurality of piezoelectric transducers 12, 14, 16 and so on, in stacked relation, which generate a voltage when compressed by leftward movement of piston 6.

Figure 2:
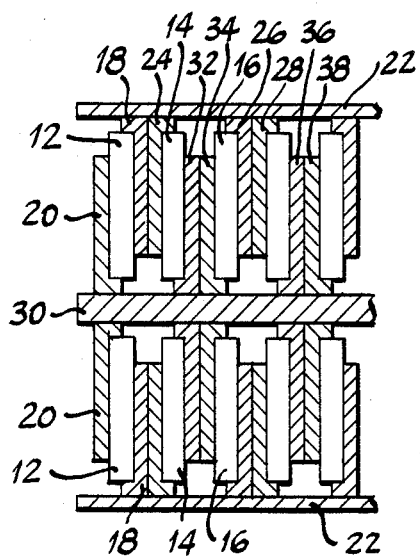
FIG. 2 is an enlarged isolated view of some of the piezoelectric discs of FIG. 1.
Figure 3:
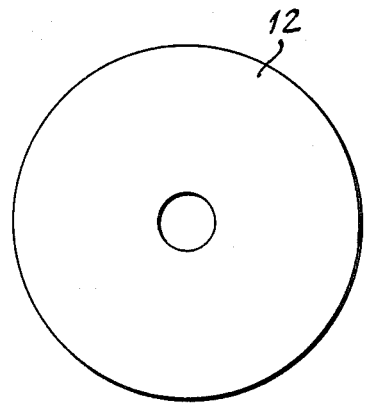
FIG. 3 is an end view of one of the piezoelectric discs, without metalization, showing its annular configuration.

As seen in FIGS. 2 and 3, each piezoelectric transducer comprises an annular ceramic disc metalized on opposite sides, for example metalizations 18 and 20 on disc 12. When disc 12 is compressed horizontally, an electric field and voltage is developed between plates 18 and 20. The metalization on each disc extends along the disc face and then along the disc edge, the annular periphery outer edge or inner edge. The discs are stacked contiguously in alternating polarity relation with abutting metalizations between adjacent discs. A first terminal T1 is connected at terminal strap 22 to every other set of abutting metalizations such as 18 and 24, 26 and 28, and so on, between discs. A second terminal T2 is connected at terminal strap 30 to the remaining every other set of abutting metalizations such as 32 and 34, 36 and 38, and son on, between discs. The terminal straps engage respective edges of the metalizations.

In the embodiment shown, the plane of each piezoelectric ceramic disc extends in one direction, such as vertical, and the discs are stacked in a second orthogonal direction, such as horizontal, between a stop 40 and piston 6, to be compressed by the latter. Metalizations 18 and 24, 26 and 28, and so on, extend vertically along the disc faces and then horizontally along the outer peripheral edge of the discs to engage terminal strap 22 of the first terminal T1. The remaining every other set of metalizations 32 and 34, 36 and 38, and so on, extend vertically along the disc faces and then horizontally along the inner edge of the discs to engage terminal strap 30 of the second terminal T2. Various shaped discs may of course be used, with various terminal arrangements. Terminal strap 22 may be a rigid stationary cylindrical member, and terminal strap 30 a rigid stationary axial member, with the disc metalization edges sliding therealong. Alternatively, terminal straps 22 and 30 may be flexible in the direction of compression in corrugated or accordian-like manner. In another alternative, the terminal straps may be wired connections to the disc metalization edges and move therewith.

In response to leftward movement of piston 6, piezoelectric stack 10 is compressed. An electric field is developed across each piezoelectric ceramic disc, and a cumulative voltage is thus generated between terminals T1 and T2.

In one implementation, a second piston 42 is provided, together with a second set 44 of a plurality of piezoelectric transducers in stacked relation and responsive to movement of second piston 42 to generate a voltage. Terminal T1 is connected at strap 22 to one polarity disc metalizations of first stack 10, and is connected at strap 46 to the opposite polarity disc metalizations of second stack 44. Second terminal T2 is connected at strap 30 to the opposite polarity disc metalizations of first stack 10, and is connected at strap 48 to the one polarity disc metalizations of second stack 44. If pistons 6 and 42 are alternately driven, an alternating polarity voltage is developed across terminals T1 and T2, whereby to afford an AC generator.

A desirable aspect of the invention is its amenability to a wide variety of engine types. For example a second piston 50 may be provided in the same combustion chamber as first piston 6. A second set 52 of a plurality of piezoelectric transducers are provided in stacked relation and responsive to movement of second piston 50 to generate a voltage across terminals T3 and T4.

Piezoelectric stack 10 is a capacitor and its alternating pulse output applies voltage to piezoelectric stack 44 to cause expansion of the latter for driving piston 42 rightwardly. Likewise, piezoelectric stack 44 is a capacitor and its alternating pulse output applies voltage to piezoelectric stack 10 to alternatingly cause expansion of the latter for driving piston 6 rightwardly. In one embodiment, a variable inductance 54 is provided in parallel across the stacks between T1 and T2. The capacitance of the stacks is then resonated with the inductance to lock in the frequency of pulses to the resonant frequency of the inductance and capacitance stack combination. In this manner, the frequency of the output AC waveform can be controlled by varying inductance 54. In a single chamber version, the capacitance of the piezoelectric stack together with a lossless delay line including one or more auxiliary capacitors in series and/or parallel as shown in dash line at 56 and 58 may be used to apply voltage to the stack to cause expansion of the latter and piston return movement.

It is recognized that various modifications are possible within the scope of the appended claims.

We claim:

1. A piezoelectric generator comprising a combustion engine having a piston driven by explosion of a fuel mixture, and piezoelectric transducer means responsive to piston movement to generate a voltage, and comprising auxiliary energy storage means connected to said piezoelectric transducer means for storing energy in response to said piston movement and for releasing said energy for return piston movement.

2. The invention according to claim 1 wherein said energy storage means comprises one or more auxiliary capacitors for applying voltage to said transducer means for return piston movement.

3. A piezoelectric generator comprising a combustion engine having a piezoelectric piston driven by explosion of a fuel mixture to generate a voltage, a second piezoelectric piston driven by explosion of a fuel mixture to generate a voltage, first and second terminals connected in one polarity relation to said first piezoelectric piston and in opposite polarity relation to said second piezoelectric piston, whereby to enable the generation of alternating polarity voltage between said terminals and thus provide direct piezoelectric conversion to AC, and wherein said explosion-driven movement of said first piston generates one polarity voltage across said first and second terminals which one polarity voltage generates return movement of said second piston oppositely to its explosion-driven direction, and wherein said explosion-driven of said second piston generates opposite polarity voltage across said first and second terminals which opposite polarity voltage generates return movement of said first piston oppositely to its explosion-driven direction, such that explosion-driven movement of each piston generates voltage and also generates return movement of the other piston by piezoelectric conversion.

* * * * *